Nov. 2, 1948.   M. LOTHROP   2,452,583
SLEEVE VALVE ENGINE
Filed Oct. 31, 1945   4 Sheets-Sheet 1

Marcus Lothrop INVENTOR
BY Ralph L Chappe ATTORNEY

Nov. 2, 1948.    M. LOTHROP    2,452,583
SLEEVE VALVE ENGINE
Filed Oct. 31, 1945    4 Sheets-Sheet 2
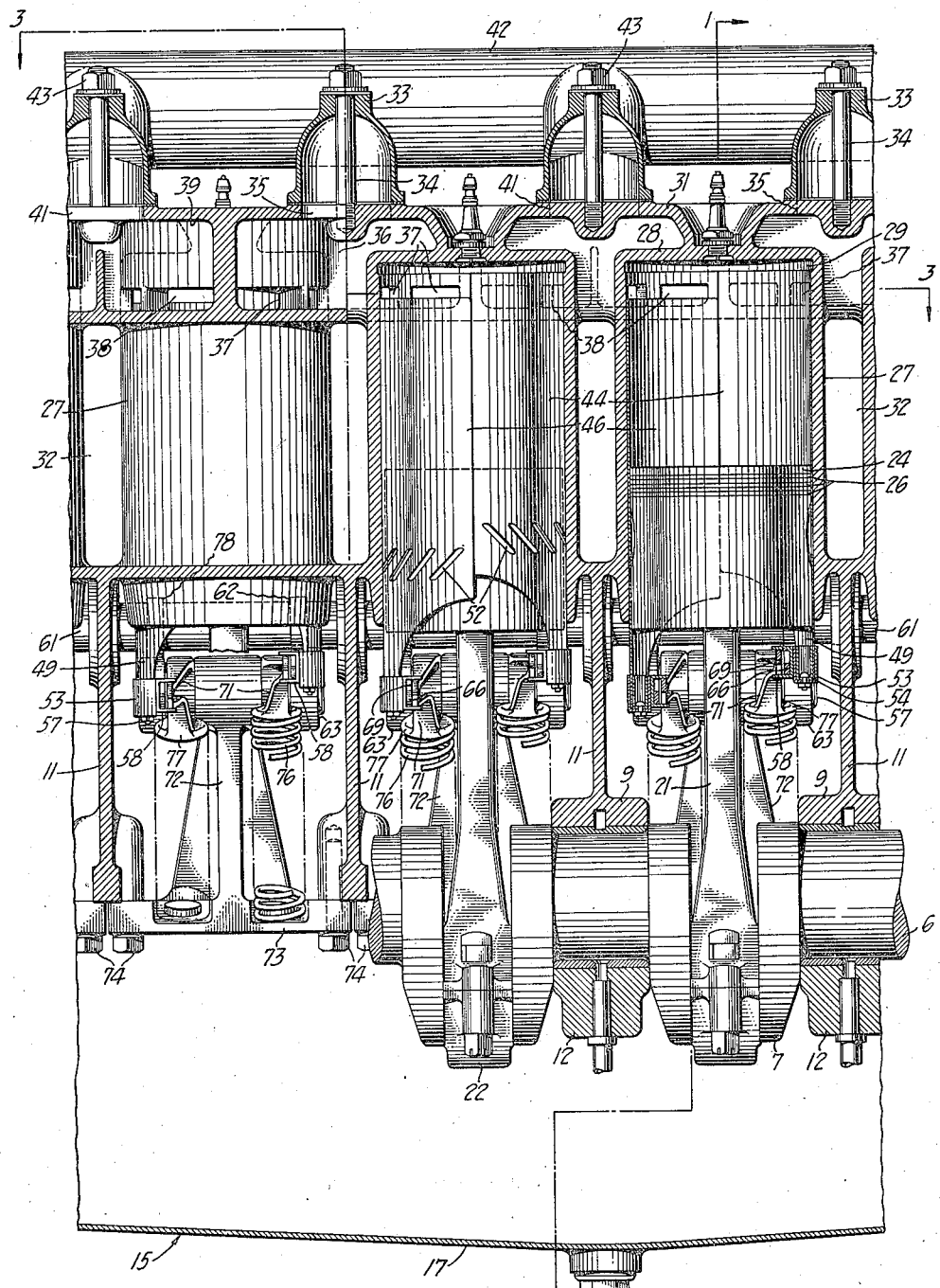
FIG_2_
INVENTOR.
Marcus Lothrop
BY Ralph L. Chappell
ATTORNEY.

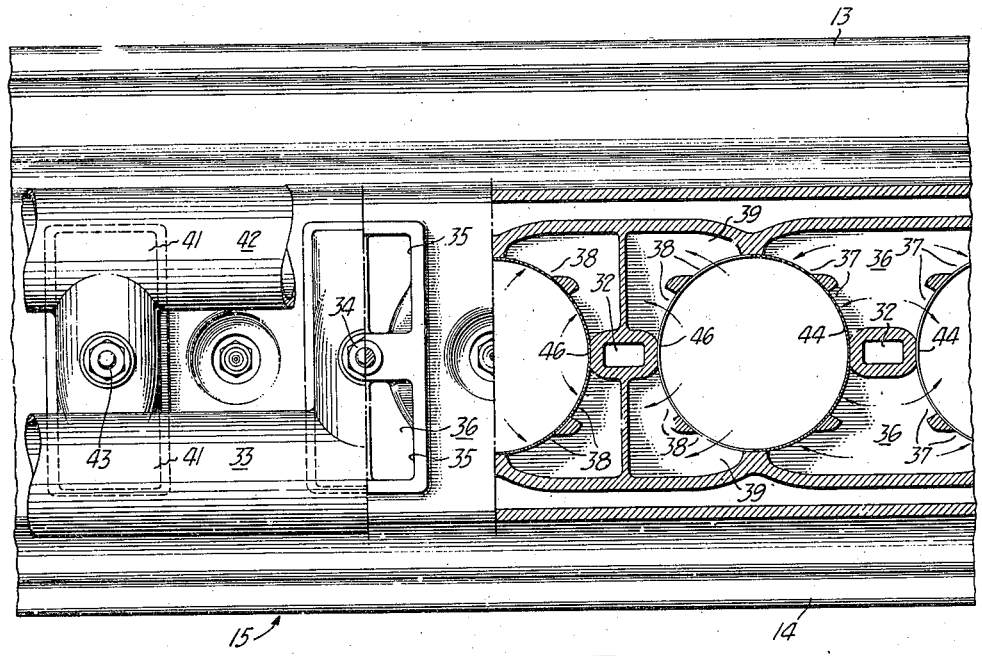
FIG_3_
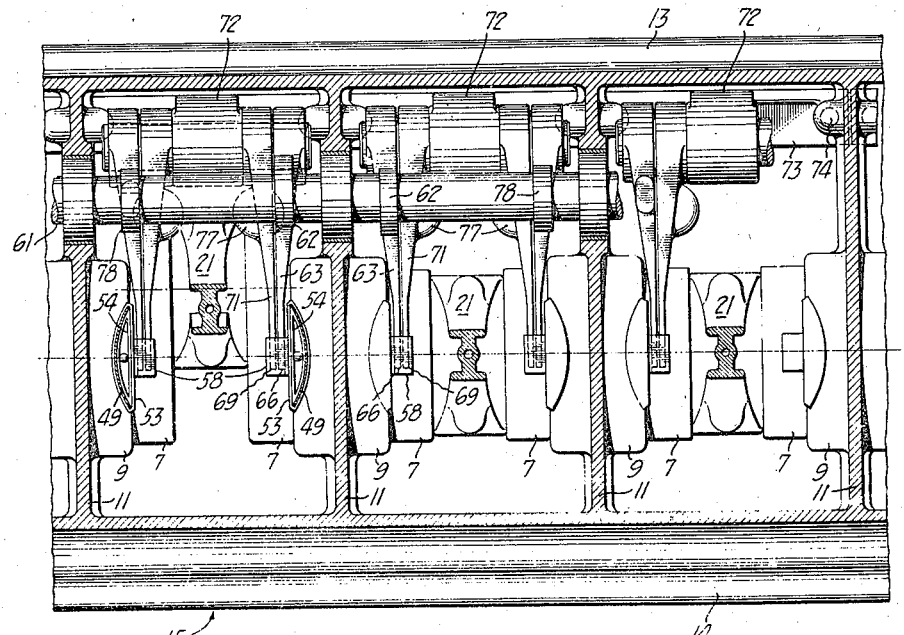
FIG_4_

Nov. 2, 1948. M. LOTHROP 2,452,583
SLEEVE VALVE ENGINE
Filed Oct. 31, 1945 4 Sheets-Sheet 4
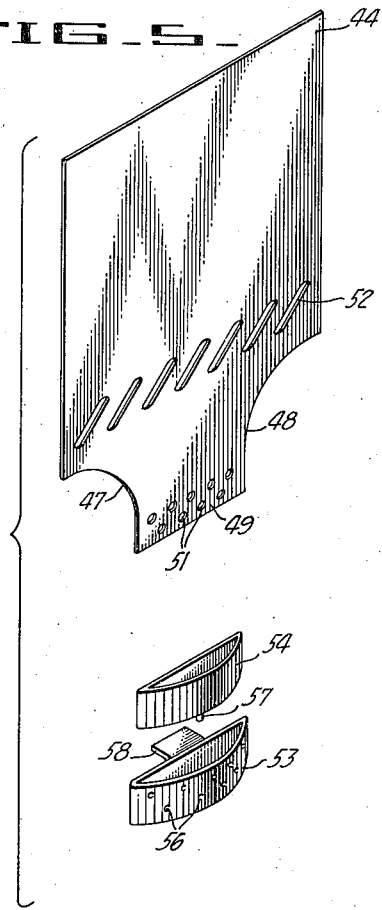
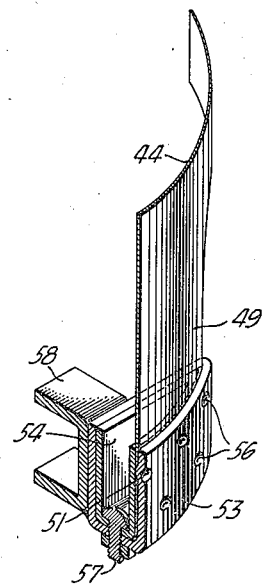
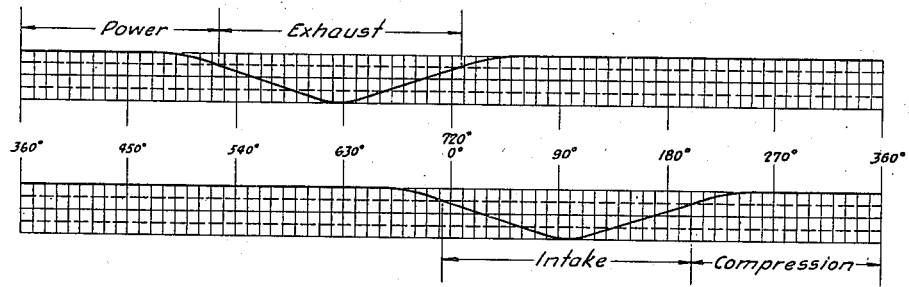
INVENTOR.
Marcus Lothrop
BY Ralph L. Chappell
ATTORNEY.

Patented Nov. 2, 1948

2,452,583

UNITED STATES PATENT OFFICE 2,452,583

SLEEVE VALVE ENGINE

Marcus Lothrop, United States Navy,
Berkeley, Calif.

Application October 31, 1945, Serial No. 625,925

4 Claims. (Cl. 123—188)

(Granted under the act of March 3, 1883, as
amended April 30, 1928; 370 O. G. 757)

The mechanism of the invention involves the valve functioning of an internal combustion engine, particularly a four-stroke cycle engine. The general aims are to improve the volumetric efficiency, that is "breathing," of the engine; to improve the valve gear to reduce pounding, shock, and noise; to simplify the construction of the combustion chamber; and to provide an improved valving mechanism readily adapted to the type of engine now virtually standard.

Certain advantages have long been recognized in sleeve valves, both in the Knight type double cylindrical sleeves and in the Burt-McCollum type single sleeve having a complex motion. But both of these sleeve valve types are open to certain objections due to leakage, lubrication difficulties, and poor thermal conduction characteristics, as well as considerable expense in manufacture.

There are advantages in the present arrangement in that leakage difficulties in part are overcome, lubrication is reasonably provided for, and thermal conduction is favorable. Weight and accelerating forces, even for high speeds, are low. The events of the cycle can be precisely established, and much of the standard arrangement of poppet valve engine design is retained. There are numerous other advantages, especially apparent in the construction of certain arrangements of engine cylinders such as radial. A general form of the mechanism is illustrated in the accompanying drawings, in which:

Fig. 2 is a view generally in cross section on a longitudinal, vertical plane of the engine, the plane of section being varied adjacent the several cylinders to show different portions of the interior construction;

Fig. 3 is, for the most part, a plan of the structure shown in Fig. 2, portions, however, being in section the plane of which is indicated by the line 3—3 of Fig. 2;

Fig. 4 is a view of the structure shown in Fig. 2, illustrated in a compound cross section the planes of which are indicated by the lines 4—4 of Fig. 1;

Fig. 5 is an exploded view of a semi-cylindrical sleeve, in planar form, together with the gripping and driving mechanism;

Fig. 6 is an isometric detail, portions being broken away, showing to an enlarged scale part of the sleeve gripping and driving structure; and Fig. 7 is a duplex diagram, showing in development the motion of the valve sleeve and the timing of the valved events.

Figure 1:
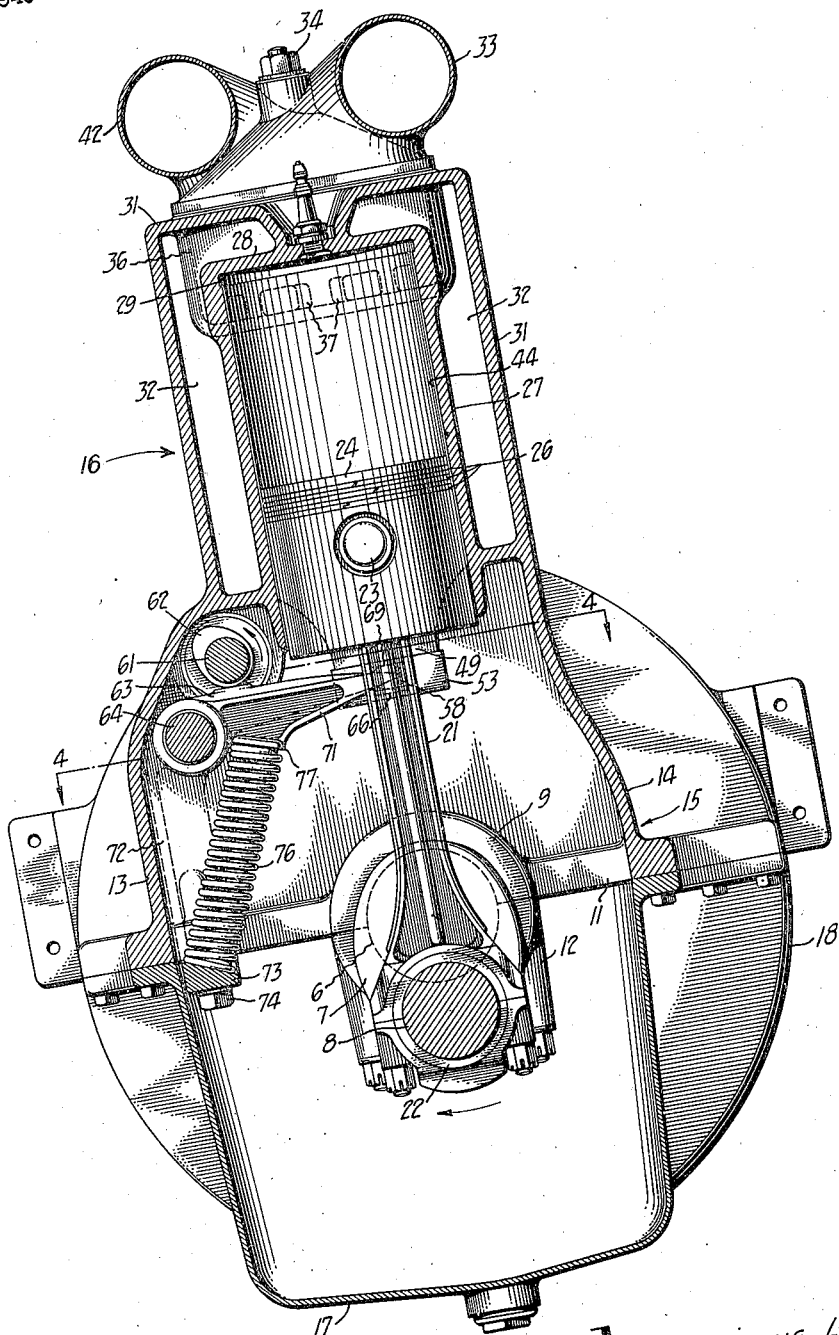
Figure 1 is a cross section on the lines 1—1 of Fig. 2, showing on a transverse, vertical plane the interior construction of a six-cylinder in line engine incorporating sleeve valves.

The illustrated multicylinder engine is comprised of substantially identical, individual cylinders, there being several shown in order to illustrate different positions of the various parts in different portions of the operating cycle. In general, the engine includes a crankshaft 6 having an appropriate number of throws 7, each including a crank pin 8. The crankshaft is suitably journaled in bearings 9 mounted in transverse webs 11 and held therein by removable bearings caps 12 in the customary fashion. The webs 11 at intervals span the space between the side walls 13 and 14 of a crankcase 15, incorporated in a cylinder block casting 16. The crankcase 15 is partially completed by a pan 17 of the usual sort, and is suitably merged with a flywheel housing 18. Various associated standard mechanisms such as oil pumps, timing gears, ignition driving gears, and the like are omitted for increased clarity of the showing.

Considering especially cylinder No. 4 of the group, as illustrated particularly in Fig. 1, the crank pin 8 is encompassed by the big end of a connecting rod 21, held in position by a removable cap 22. The rod 21 extends upwardly to surround a wristpin 23 journaled for oscillation in a circular piston 24 of the customary type, carrying a plurality of piston or sealing rings 26. The piston 24 is confined to rectilinear translation indirectly by the walls 27 of a cylinder of circular cross section somewhat greater in interior diameter than the exterior diameter of the piston 24 in order to leave somewhat more than the customary clearance therebetween. This clearance can be referred to as an annular space. The cylinder 27 is preferably fabricated as a unit with the remainder of the cylinder block 16, and is continued and inturned above the piston 24 to provide a cylinder head 28 to complete the closure of a combustion chamber 29. Since the engine illustrated is of the water-cooled type, the engine block 16 also includes an integrally fabricated jacket wall 31, in part defining a water jacket 32 surrounding the various portions of the cylinder that customarily receive such treatment. With the mechanism as so far described, there is afforded a structure for converting the rectilinear translation of the piston into the customary rotary motion of the crankshaft.

To produce a fuel charge for the desired four-stroke cycle operation, the engine block 16 is provided in abutment with its finished upper surface with a multiple intake manifold 33, held by fastening bolts 34 and extending from a suitable charge-forming device such as a carburetor, not shown. The intake manifold has branches, one for each pair of cylinders. Each branch registers with the appropriate pair of openings 35 leading to an intake cavity 36 formed in the casting of the engine block. The cavity 36 extends to surround approximately half of the upper periphery of the cylinder 27. Affording communication between the cavity or pocket 36 and the interior of the combustion chamber 29 is a series of inlet ports 37, rather accurately positioned and formed as to their axial dimension or height, and of a combined area approximately the same as that afforded by a poppet valve designed for an engine of the same displacement.

In a comparable fashion, communication is likewise established from the interior of the combustion chamber 29 through a group of exhaust ports 38 leading into an exhaust pocket 39, preferably integrally cast in the cylinder block. The pocket 39 in turn communicates through a pair of exhaust openings 41 with a multiple exhaust manifold 42 held onto the engine block 16 by suitable fastenings 43 and extending to any appropriate point of discharge. There is thus afforded a relatively free and direct path for fluid flow into and out of the combustion chamber. The arrangement facilitates casting of the cylinder block and head as a unit. The disposition of metal is sufficiently regular and symmetrical to reduce casting and operating strains. The flow of cooling fluid over the parts most in need of careful temperature control is facilitated.

In accordance with the invention, sleeve valves are provided for controlling flow through the intake ports 37 and the exhaust ports 38 in appropriate timed relation with the operation of the engine. Fitting within the cylinder 27 and occupying the larger-than-normal clearance space between the cylinder wall and the piston 24, is a pair of substantially identical valve sleeves 44 and 46, respectively. The sleeves are illustrated in enlarged detail in Figs. 5 and 6. Each of them is preferably half of a circular cylinder in form, and is fabricated of thin, deformable or flexible material such as stainless steel or a steel having a substantial nickel and chromium content. The thickness of the material of the sleeve cannot be given precisely, as it varies with operating characteristics and also in accordance with the duty required of the engine. As an example, an engine cylinder having a bore of four inches might be furnished with sleeves having a material thickness of the order of $\frac{1}{32}$".

Preferably, the sleeve is fabricated by being initially stamped or cut from a flat strip or sheet. When flat, as shown in Fig. 5, it is approximately a rectangle having two of its corners cut away along curves such as 47 and 48 to define a reduced tab 49, pierced by a plurality of holes 51. In addition, there may in some cases be provided a plurality of holes 52 for reducing the weight of the valve sleeve, and for permitting the passage of fluid such as oil from one side thereof to the other. Prior to or upon insertion into the engine cylinder, the valve 46 is deformed into a semicircular cylindrical shape and the tab 49 is laid against the inner curved wall of an outer cup 53 of segmental configuration. An inner cup 54 of nesting segmental configuration is then drawn into nested position. One of the cups, for example the cup 53, is formed with a number of inwardly extending projections 56, adapted to project into the holes 51 when the sleeve is laid against the cup wall.

The effect of the nested cups and of the projections and holes is to afford a tight grip on the curved sleeve.

The parts are held in assembled relation by a nut and bolt fastening device 57, the bolt, preferably, being spot-welded to the inner cup 54. The outer cup 53 also serves as a support and connector for an actuator follower 58 in the form of a channel, preferably welded to the outer cup in a position so that the channel central axis is about in a plane that is parallel to the cylinder axis and that contains the center of mass of the sleeve.

When a pair of valve sleeves, as described, is introduced into the cylinder, the extra clearance between the cylinder wall and the piston is substantially all occupied. The expansive force of the piston rings 26 tends to spread the sleeves into close sliding contact with the cylinder walls so that the sleeve edges are in freely sliding, nearly-abutting relationship; that is, the semi-cylindrical sleeves are concentric but their edges are very slightly spaced apart.

To provide actuating mechanism for the pair of semi-cylindrical sleeves in each cylinder, the crankcase 15 is formed with journals suitably supporting a camshaft 61 of substantially standard construction. The camshaft is driven in a counterclockwise direction, as seen in Fig. 1, by timing gears of the usual sort (not shown), one of which is mounted on the clockwise rotating crankshaft 6. For each cylinder the camshaft 61 is provided with an intake cam 62 bearing upon a cam lever 63. One end of the cam lever is journaled on one stub of a mounting shaft 64 and its other end terminates in a bearing button 66 adapted to slide against the lower inside surface of the follower 58. Sliding against the upper inside surface of the follower 58 is a bearing button 69 fastened in the outboard end of a spring lever 71. The opposite end of the lever 71 is journaled on another stub of the mounting shaft 64.

A T-shaped bracket 72 carries the mounting shaft 64 and is disposed to one side of the crankshaft 6. The bracket is provided with a bottom platform 73 extending longitudinally of the crankcase and resting at opposite ends upon adjacent transverse webs 11 of the crankcase 15, being removably held thereon by long machine screws 74. The bracket 72 likewise affords support for the lower end of a helical compression spring 76, the upper end of which abuts a spring pad 77 integrally formed with the spring lever 71. A similar lever and spring mechanism is mounted in mirror symmetry on the opposite side of the cylinder axis of the bracket 72 for connecting the other sleeve in the cylinder to an exhaust cam 78 on the camshaft 61. The spring actuation can be replaced by cam actuation for positive sleeve motion in both directions, if desired, although the illustrated embodiment is preferable in the engine shown.

With this structure, when the crankcase pan 17 is removed, the engine can be disassembled from below. As the two machine screws 74 holding each bracket 72 in position are withdrawn, the springs 76 resting thereon are gradually released and the buttons 66 and 69 retract transversely from the sleeve actuator channels 58. The bracket and the springs and levers mounted thereon are then readily withdrawable through the bottom of the engine crankcase leaving the sleeves for subsequent axial retraction. The reverse operations put the structure in place as shown in Fig. 1, the springs being gradually compressed as the screws 74 are tightened. The urgency of the intake spring 76 is such as to tend to rotate the spring lever 71 in a counterclockwise direction against the upper inner surface of the follower 58, so that the lower inner surface of the follower then bears against the cam lever 63 and tends to force the cam lever against the surface of the cam 62.

The effect of this mechanism is to insure that there is no clearance or play or backlash in any of the valve actuating mechanism, as the entire structure is at all times under the pressure of the spring 76. In addition, the spring 76 is available to absorb any undue shocks which may tend to drive its associated valve sleeve out of the cylinder.. If backlash is not considered important or a small amount can be tolerated, the levers 63 and 71 can be consolidated into a single lever, the structure otherwise being unchanged. Furthermore, the actuating mechanism prevents more than nominal rotation of the sleeves within the cylinder.

When the mechanism is operated, the cycle is the standard four-stroke Otto cycle but with certain advantages in the valve motion. That is, the axial travel of each valve is substantially twice, for example, the amount of valve port height or opening. As shown in the lower portion of Fig. 7, the cam effective to move the previously stationary intake sleeve begins to accelerate such sleeve for some 40° of crank travel before the inlet event is to start. Hence, when the valve overruns the edge of the inlet port it is traveling at a relatively rapid rate, and a very quick port opening is obtained. There is considerable overtravel of the port by the sleeve so that the valve sleeve reversal occurs with comparatively low decelerating forces. In a similar way, the valve sleeve during its return motion overruns the edge of the intake port and continues its travel during deceleration in order to afford a quicker-than-usual cutoff of the intake event and moderate deceleration forces. Quite similar characteristics are obtained in the exhaust event by a similar overtravel of the exhaust sleeve. The effect of the two semicylindrical sleeves, therefore, is to control the introduction and exhaust of gas in accordance with the standard internal combustion engine cycle but with sharper opening and closing with lower valve actuating forces and without pound or shock.

There are, in addition to those already mentioned, some other special considerations. In contradistinction to the Knight type sleeve valves which utilize a "junk" or upper sealing ring in order that the sleeves may be balanced against cylinder pressure, the present semicylindrical sleeves are unbalanced as they are exposed at all times along their upper edge area to the cylinder pressure. Since, however, the sleeves are extremely thin, the unbalanced pressure, which usually tends to drive the sleeves out of the cylinder, is not very large, and is at least in part resisted by the friction of the sleeves and also by the sleeve actuating mechanism. Thus, the junk ring or sealing ring is dispensed within an acceptable fashion.

Also, in contradistinction to both the Knight type and Burt-McCollum type sleeves which move continuously during the operation of the engine, the semicylindrical sleeves in the present instance move only during the events they control, or substantially so, and are quite stationary throughout a large part of the cycle. This is an advantage as there is no necessity for moving the sleeves when the cylinder pressures are extremely high. For example, both sleeves are stationary during the compression stroke, during explosion, and during all of the expansion stroke except for the last part thereof. The greatest internal pressure existing when a sleeve must be put in motion, therefore, occurs just prior to the opening of the exhaust port, and this relatively moderate pressure is quickly reduced to a low value as soon as the exhaust valve opens the port a trifle. During the times the pressure within the cylinder is the greatest, i. e., during and toward the end of the compression stroke, during the explosion, and during the greater part of the expansion stroke, the two semi-cylindrical valve sleeves are stationary and are forced apart by the pressure. They consequently then more closely overlie their respective valve ports to improve the sealing effect and to reduce leakage through the ports. The valve sleeves can be positioned about 90 degrees of rotation from their illustrated positions and arranged so that the piston side thrust at the beginning of the exhaust event is on the inlet sleeve thus reducing the actuating force. Intermediate positions of rotation of the sleeves can also be used but these latter are not as suitable for patent illustration.

It is true that the nearly abutting or facing edges of the semicylindrical sleeves must have running clearance. These spaces or gaps, augmented during high internal cylinder pressure and especially after the sleeves are old and worn, provide peripheral, straight channels through which gas from the combustion chamber can escape to the crankcase. This leakage is tolerated as a necessary evil, as quantitatively it is not of consequence especially at moderate and high engine speed. Also, the cross section of such a long leakage passage is not greatly different from the cross section of the leakage path past the split piston rings 26, often tolerated in engines. Even so, the edge clearance is made as small as feasible.

Some care must also be taken to preclude excessive deformation of the flexible sleeves particularly during the explosion event, and for that reason suitable supporting lands or bridges are provided, as shown in Fig. 3, between the various inlet and exhaust ports. There may be a tendency to burn the upper edge especially of the exhaust sleeve, but this edge is normally and for a considerable portion of its cycle in fair thermal contact with the cylinder wall both above and below the ports and is thereby both protected from flowing gas and relieved of its heat. The sleeve-edge temperature is a factor that is important in determining the thickness and the material of the exhaust sleeve.

In accordance with the described design, there is afforded an improved valve mechanism wherein the valves are relatively cheap to manufacture, wherein no special sealing devices are needed, wherein the valves themselves constitute in effect a removable cylinder liner, wherein the combustion chamber and cylinder design are straightforward, and wherein the volumetric efficiency is high and the valve actuating mechanism stresses are low.

Since the mechanism is useful in other mechanisms than internal combustion engines, for example, in pumps, references in the claims to an "engine" are with the broad connotation of the word "engine" as referring generally to a suitable device.

The invention described herein may be manufactured and used by or for the Government of the United States of America for governmental purposes without the payment of any royalties thereon or therefor.

What is claimed is:

1. In an engine having a circular cylinder with a port therein, a deformable sleeve, and nesting members for deforming said sleeve to fit slidably within said cylinder to cover said port.

2. In an engine having a cylinder with ports therein and a piston slidable within the cylinder, the combination therein of a thin, flexible sleeve slidably disposed between the cylinder and piston, the sleeve being movable to cover and uncover the ports, means for linking the sleeve to a moving element including a member having projections thereon which are in engagement with portions defining openings in the sleeve, another member in nested relation with the first-named member for effecting close contact of the sleeve therewith, and means for holding the nesting members in engagement.

3. In an engine having a cylinder with ports therein and a piston slidable within the cylinder, the combination therein of a thin, flexible sleeve disposed between the cylinder and the piston, the sleeve being movable to cover and uncover the ports, means for linking the sleeve to a moving element including a female cup-shaped member with projections disposed interiorly thereon, said projections engaging portions defining perforations in said sleeve, a male member positioned within the female cup-shaped member and thereby effecting a close proximity of the sleeve with the interior of the female member, means securing together the male and female members, and means including a channeled portion disposed exteriorly on said female member for connection to the moving element.

4. A clamp for use in an engine having a cylinder with ports therein, a piston within said cylinder, moving elements which function in timed relation with the operation of the engine and a thin, flexible sleeve disposed between said cylinder and piston, the sleeve being movable to cover and uncover said ports, the clamp being disposed for linking the sleeve to said moving elements and including a member having projections thereon which are in engagement with portions defining openings in the sleeve, another member in nested relation with the first-named member for effecting close contact of the sleeve therewith, and means for holding the nesting members in engagement.

MARCUS LOTHROP.

REFERENCES CITED

The following references are of record in the file of this patent:

UNITED STATES PATENTS

| Number | Name | Date |
|---|---|---|
| 974,809 | Mustad | Nov. 8, 1910 |
| 1,010,566 | Alltree | Dec. 5, 1911 |
| 1,031,991 | Fairfield | July 9, 1912 |
| 1,054,714 | Renault | Mar. 4, 1913 |
| 1,134,867 | Keister | Apr. 6, 1915 |
| 1,142,074 | Woodward | June 8, 1915 |
| 1,384,401 | Noble | July 12, 1921 |
| 1,549,297 | Coyne | Aug. 11, 1925 |
| 1,809,585 | Edwards | June 9, 1931 |
| 1,881,330 | Smith | Oct. 4, 1932 |
| 2,216,953 | Maxwell | Oct. 8, 1940 |

FOREIGN PATENTS

| Number | Country | Date |
|---|---|---|
| 15,907 | Great Britain | July 8, 1911 |